United States Patent
De Saro et al.

(10) Patent No.: US 9,956,609 B1
(45) Date of Patent: May 1, 2018

(54) METAL SORTING, MELTING AND FABRICATION APPARATUS AND METHODS

(71) Applicant: Melt Cognition, LLC, Bedford, MA (US)

(72) Inventors: Robert De Saro, Annandale, NJ (US); Diran Apelian, West Boylston, MA (US); David B. Spencer, Bedford, MA (US); Michael Scott Mellen, Wayland, MA (US)

(73) Assignee: Melt Cognition, LLC, Bedford, MA (US)

( * ) Notice: Subject to any disclaimer, the term of this patent is extended or adjusted under 35 U.S.C. 154(b) by 133 days.

(21) Appl. No.: 14/747,341

(22) Filed: Jun. 23, 2015

Related U.S. Application Data

(60) Provisional application No. 62/016,484, filed on Jun. 24, 2014.

(51) Int. Cl.

| | | |
|---|---|---|
| *B22D 47/00* | (2006.01) | |
| *B22D 21/00* | (2006.01) | |
| *F27D 19/00* | (2006.01) | |
| *B22D 1/00* | (2006.01) | |
| *B22D 2/00* | (2006.01) | |
| *B22D 7/00* | (2006.01) | |
| *B22D 9/00* | (2006.01) | |
| *B22D 46/00* | (2006.01) | |
| *C22B 9/16* | (2006.01) | |
| *B07C 5/34* | (2006.01) | |

(52) U.S. Cl.
CPC ............... *B22D 47/00* (2013.01); *B07C 5/34* (2013.01); *B22D 1/00* (2013.01); *B22D 2/00* (2013.01); *B22D 7/00* (2013.01); *B22D 9/00* (2013.01); *B22D 21/007* (2013.01); *B22D 46/00* (2013.01); *C22B 9/16* (2013.01); *F27D 19/00* (2013.01); *F27D 2019/0003* (2013.01)

(58) Field of Classification Search
CPC ......... B22D 47/00; B22D 46/00; B22D 7/00; B22D 9/00; B22D 1/00; B22D 21/007; C22B 9/15; F27D 19/00; F27D 2019/0003; B07C 5/34
USPC ................. 209/509–707, 234; 266/44, 901
See application file for complete search history.

(56) References Cited

U.S. PATENT DOCUMENTS

| | | | | |
|---|---|---|---|---|
| 3,561,743 A | * | 2/1971 | Schroeder | G05B 13/02 266/225 |
| 4,165,179 A | | 8/1979 | Sato | |
| 6,227,847 B1 | * | 5/2001 | Gillespie | F23G 5/02 110/236 |
| 6,545,240 B2 | * | 4/2003 | Kumar | B07C 5/3425 209/579 |
| 6,657,721 B1 | | 12/2003 | Palleschi et al. | |
| 6,762,835 B2 | | 7/2004 | Zhang et al. | |
| 6,784,429 B2 | | 8/2004 | De Saro et al. | |
| 6,888,917 B2 | | 5/2005 | Sommer, Jr. et al. | |
| 6,909,505 B2 | | 6/2005 | Lucas et al. | |
| 7,663,749 B2 | | 2/2010 | Levesque et al. | |
| 7,667,838 B2 | | 2/2010 | Ackerman et al. | |
| 7,763,820 B1 | | 7/2010 | Sommer et al. | |
| 8,125,627 B2 | | 2/2012 | Dottery et al. | |
| 8,633,437 B2 | | 1/2014 | Dantus et al. | |
| 8,855,809 B2 | | 10/2014 | Spencer et al. | |
| 2003/0174325 A1 | | 9/2003 | Zhang et al. | |
| 2003/0197125 A1 | * | 10/2003 | De Saro | G01N 33/206 250/339.07 |
| 2007/0296967 A1 | | 12/2007 | Gupta et al. | |
| 2008/0151223 A1 | | 6/2008 | Treado et al. | |
| 2008/0170218 A1 | | 7/2008 | Dantus et al. | |
| 2008/0267249 A1 | * | 10/2008 | Della Vedova | C21C 5/527 373/79 |
| 2009/0040505 A1 | | 2/2009 | Ackerman et al. | |
| 2009/0091745 A1 | | 4/2009 | Levesque et al. | |
| 2010/0085567 A1 | | 4/2010 | Dottery et al. | |
| 2010/0324832 A1 | | 12/2010 | Levesque et al. | |
| 2012/0099103 A1 | | 4/2012 | Hahn | |
| 2014/0231314 A1 | * | 8/2014 | Pillkahn | B07C 5/342 209/3.1 |

OTHER PUBLICATIONS

[No Author Listed], Modern Electro/Thermochemical Advances in Light-Metal Systems (Metals). ARPA-E OFA. Funding Opportunity No. DE-FOA-0000882. Modification 002. May 21, 2013;7. Table 1.
Bulajic et al., A procedure for correcting self-absorption in calibration free laser induced breakdown spectroscopy. Spectrochimica Acta Part B. 2002;57:339-53.
Ciucci et al., New Procedure for Quantitative Elemental Analysis by Laser-Induced Plasma Spectroscopy. Appl Spectroscopy. 1999;53(8):960-4.
Cremers et al., Chapter 7: Remote LIBS Measurements. Handbook of Laser Induced Breakdown Spectroscopy. John Wiley and Sons. 2006;171-96.
Cremers et al., Chapter 8: Examples of Recent Libs Fundamental Research, Instruments and Novel Applications. Handbook of Laser Induced Breakdown Spectroscopy. John Wiley and Sons. 2006;197-226.
De Saro, Thermal efficiency Limits for Furnaces and Other Combustion Systems. J Thermophys Heat Transfer. Jul.-Sep. 2008;22(3):532-7. doi: 10.2514/1.28239.
Energetics Inc., ITP Aluminum: Energy and Environmental Profile of the U.S. Aluminum Industry. Table 1-7. Jul. 1997. 2 pages.
Herrera et al., Semi-quantitative analysis of metal alloys, brass and soil samples by calibration-free laser-induced spectroscopy: recent results and consideration. J Anal Atom Spectrom. 2009;24:413-25.
Pershin et al., Laser Plasma Emission Spectrum Corrected for the Quantitative Analysis of Alloys. Tech Phys Lett. 2005;31(9):741-5.
Rai et al., Laser-induced Breakdown Spectroscopy of Molten Aluminum Alloy. Appl Optics. Apr. 20, 2003;42(12):2078-84.
Reinhardt et al., Innovative Equipment to Decoat Scrap Aluminum. ACEEE 1995 Summer Study on Energy Efficiency in Industry, Grand Island, NY. Aug. 1, 1995;463-76.
U.S. Department of Energy, Energy-Efficient Isothermal Melting of Aluminum. Office of Energy Efficiency and Renewable Energy. Feb. 15, 2006. 1 page.

* cited by examiner

*Primary Examiner* — Jessee Roe
*Assistant Examiner* — Michael Aboagye
(74) *Attorney, Agent, or Firm* — Wolf, Greenfield & Sacks, P.C.

(57) ABSTRACT

According to some aspects, a system for producing a target molten metal composition is provided. The system includes a sorting device that sorts input pieces of metal based on a control signal. Sorted pieces of metal are melted in a furnace, and a sensor measures the composition of molten metal in the furnace and in response generates a control signal that is sent to the sorting device.

22 Claims, 10 Drawing Sheets

400

METAL SORTING, MELTING AND FABRICATION APPARATUS AND METHODS

CROSS-REFERENCE TO RELATED APPLICATIONS

This application claims the benefit under 35 U.S.C. § 119(e) of U.S. Provisional Patent Application Ser. No. 62/016,484, filed on Jun. 24, 2014 and entitled "Aluminum Sorting and Casting Apparatus and Methods" which application is hereby incorporated herein by reference in its entirety.

BACKGROUND

Field

The present application relates to metal processing, including metal sorting, melting, and fabrication.

Related Art

Currently, casting metal products such as those made from aluminum using scrap is a multi-stage process with stages typically being performed at multiple facilities. Conventionally, at least three stages are performed at different industrial sites: i) the scrap is sorted at a scrap yard; ii) the scrap is transported to a secondary smelter where it is cleaned, decoated, melted, alloyed, and cast into an ingot; and iii) the ingot is remelted at a casting facility and cast or otherwise formed into a product. Conventional aluminum casting processes typically require the addition of primary aluminum, such that the finished aluminum products are not cast solely using aluminum scrap from the scrap yard. In the case of aluminum, the primary metal is virgin aluminum produced directly from bauxite using the Hall-Heroult process, which uses around twenty times the energy used to process scrap aluminum.

SUMMARY

According to some aspects, a system for producing a target molten metal composition is provided, the system comprising a sorting device configured to receive pieces of metal as input, receive a control signal specifying at least one metal for the sorting device to preferentially output, determine classifications of the input pieces of metal, and output sorted pieces of metal based on the determined classifications of the pieces of metal and the control signal. The sorted pieces of metal may include the at least one metal. The system further comprises a furnace configured to receive the sorted pieces of metal from the sorting device and to melt the received pieces of metal to generate a bath of molten metal. In some embodiments, the furnace comprises at least one sensor configured to analyze a composition of the bath of molten metal. The system further comprises at least one processor configured to receive data from the at least one sensor indicating the composition of the bath of molten metal, and to output the control signal to the sorting device. The control signal may be based on a comparison of the received data with the target molten metal composition.

According to some aspects, a method for producing a target molten metal composition is provided. The method comprises outputting, from a sorting device, sorted pieces of metal based on determined classifications of pieces of metal input to the sorting device and a first control signal specifying at least one metal for the sorting device to preferentially output. The sorted pieces of metal include the at least one metal. The method further comprises melting the sorted pieces of metal into a bath of molten metal, analyzing a composition of the bath of molten metal, and providing a second control signal to the sorting device based at least in part on a comparison between the target molten metal composition and data indicating the composition of the bath of molten metal.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
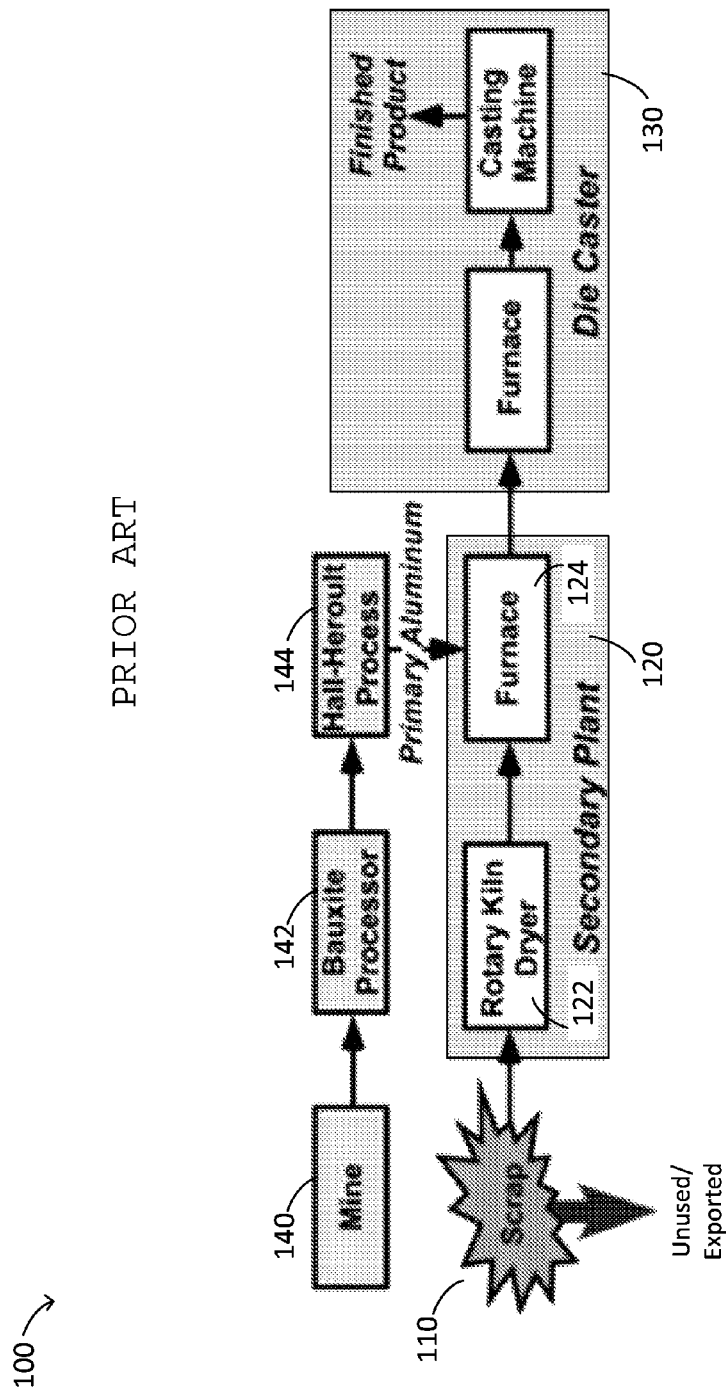
FIG. 1 illustrates a conventional setup and process for casting aluminum products from aluminum scrap.

FIG. 1 depicts an illustrative conventional aluminum casting process. In process 100, scrap metal is obtained from a scrapyard 110 and sorted by metal type. The scrap is then shipped to a secondary aluminum plant 120 where it is sometimes passed through a decoating kiln 122 to remove organics and other contaminants. Next, the scrap is fed into a fossil-fired reverbatory melter (or similar furnace) 124 where it is melted. In addition, aluminum obtained by mining bauxite from a mine 140 and processing the bauxite with a bauxite processor 142 into virgin aluminum (via Hall-Heroult process 144) is provided as the primary metal into furnace 124. Using both metal sources, the secondary plant 120 produces cooled, solid ingots which are shipped to a die caster 130 where they are re-melted with a furnace and then processed into a finished product in a die casting machine.

The inventors have recognized that such conventional techniques for casting or otherwise forming metal products are inefficient in multiple respects. Since metal scrap and primary metals are typically obtained in separate locations, are melted at another location to form ingots, and then sent to yet another location to form a metal product, this process may require significant infrastructure and expense to transport materials between locations. In addition, changes that may be desired throughout the process (e.g., adjustments to the amount of scrap added to the formed ingots) may take time to be reflected in the end product due to the transportation delays inherent in the process.

In addition, use of significant quantities of virgin metal to produce a desired purity level in ingots manufactured at the secondary plant (e.g., plant 120 in FIG. 1) may be an undesirable yet necessary part of a conventional process. While virgin metal may require much more energy to produce than scrap containing the same metal, the contents of the scrap pieces may not be accurately known. Thus, virgin metal may be a necessary addition to the reservoir of molten metal (sometimes called "the melt") to ensure that elements other than the metal(s) of interest present in the scrap do not reduce the purity of the melt to too great an extent. While samples may periodically be drawn from the melt and analyzed, this analysis takes time (e.g., 15 minutes or more) to perform, and any actions taken as a result involve manually selecting scrap to be added to the melt to adjust the melt chemistry, during which time the production of ingots at the secondary plant may be halted. The length of this process needed to produce the desired melt chemistry can therefore extend melt time by hours, which causes unnecessary metal oxidation and heat loss in the furnace.

The inventors have recognized and appreciated that an integrated metal sorting, melting and fabrication system may be produced that mitigates or eliminates the above-described inefficiencies in conventional processes. In particular, the integrated system utilizes a scrap sorter and a furnace at a single physical location and provides feedback on the chemistry of the melt to the scrap sorter sufficiently quickly to prevent breaks in the operation of the overall system. In some embodiments, the feedback may be provided in real time. Accordingly, in some embodiments a target metal composition may be produced from the furnace without it being necessary to supply significant quantities of virgin (or other high purity) metal. Rather, scrap may be supplied as input to the system and particular scrap may be identified based on its metal content(s) and selectively supplied to the furnace to produce a desired melt chemistry.

In the integrated system described herein it may also be unnecessary to melt the metal twice, since the furnace can be configured to supply a target metal composition directly to a die casting machine and/or other metal forming device. Furthermore, each unit within the integrated sorting, melting and fabrication system may have an increased energy efficiency over comparable units within a conventional system due to being at a common (single) physical location. For instance, energy produced as a by-product of one step of the process may be used within another step of the process in the integrated system, which is simply not feasible in a system that is spread over multiple locations. In these illustrative ways, the integrated system described herein may produce metal products more quickly and with more energy efficiency than a conventional processes, such as that shown in FIG. 1, by eliminating the need to transport metals between facilities, by reusing by-products of the process, and by producing an end product from a single melt.

According to some embodiments, an integrated metal sorting, melting and fabrication system as described herein may be operable in a continuous mode. That is, the system may be configured, in at least some operating modes, to continuously receive scrap metal as input and to continuously produce metal products as an output. While rates of system input, system output and/or rates of input and output to/from various stages within the system may change over time during operation, in some embodiments the system may be operable such that metal products are continuously produced from scrap. This has numerous advantages over conventional systems in which intermediate stages output products that are transported to another location before being used as input to a subsequent stage. For instance, the metal products may be produced with a desired composition at a constant rate, in contrast to a conventional system in which transportation delays and/or delays may occur when the melt chemistry is tested and then manually adjusted.

According to some embodiments, an integrated metal sorting, melting and fabrication system may include multiple fabrication devices, including any number of die casters, foundries and/or rolling mills. The fabrication devices may each receive molten metal from a prior process (e.g., a furnace) and use the metal to fabricate metal products. For instance, multiple die casters may be operated in parallel to produce die cast metal products from a single source of molten metal. While the die casters may not be able to continuously produce metal products, using a plurality of die casters may allow the system to operate in a continuous mode, as described above. That is, while a single die caster may not be operated to continuously receive molten metal as input, a collection of die casters may be operated as such so that the collection may produce metal products continuously from the molten metal, which may be at a substantially constant rate.

According to some embodiments, an integrated metal sorting, melting and fabrication system may comprise a sorting device configured to identify and separate multiple metals (including alloys) in incoming scrap. Such a sorting device may also, in some embodiments, be operable in a continuous mode such that particular metals to be supplied to a subsequent process (e.g., melting in a furnace) may be identified and supplied separate from other scrap metal that is not supplied to the subsequent process.

According to some embodiments, the sorting device may receive control data indicating one or more metals to preferentially supply to a subsequent stage of the system. The sorting device may then, based on the control data, selectively output particular pieces of scrap containing at least one of the one or more metals to the subsequent stage (e.g., a decoater, a furnace, etc.). The control data may change over time so that the sorting device may, over time, adjust the types of metals it selectively outputs to subsequent processes in the system. According to some embodiments, such control data may be based on one or more measurements of a melt. For instance, the control data may be generated by comparing a determined melt composition with a target metal composition. In this way, the control data may direct the sorting device to selectively output metal(s) to the melt to make the chemistry of the melt more similar to that of the target metal composition. This feedback process may be repeated until the melt has a chemistry that matches the target metal composition to within a desired tolerance.

According to some embodiments, scrap metal selectively output from a scrap sorter in the integrated system may be supplied to a decoating device, which removes organic materials and/or other contaminants from the scrap. The decoated scrap pieces may then be supplied directly to a furnace. According to some embodiments, the decoating device may heat the pieces of scrap in order to, or as a secondary result from, removing the contaminants such that hot pieces of scrap are supplied to the furnace for melting. Thus, the energy needed to melt the scrap may be reduced by directly providing scrap from the decoating device to the furnace. According to some embodiments, the decoating device may combust contaminants removed from scrap to, at least in part, drive the decoating process.

According to some embodiments, the integrated system may include one or more sensors for analyzing molten metal in-situ, such as within a furnace or other vessel. This analysis may indicate the presence of particular metals within the melt, which may be obtained by a controller (e.g., a computer) within the integrated system. By comparing results of the analysis with a desired target composition of the melt, control data as described above may be formed and provided to a sorting device within the system.

Following below are more detailed descriptions of various concepts related to, and embodiments of, an integrated metal sorting, melting and fabrication system. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

The term "real time" is used herein to describe the timing at which certain actions are taken within the types of systems described herein, such as with respect to metal sortation and/or melt analysis. In some embodiments, the term "real time" may refer to timing such that multiple interconnected components of the types of systems described herein need not halt their operation. For instance, a control signal provided "in real time" from a sensor, such as a metal melt sensor, to a sorting device may be provided less than a minute after the sensor analyzes the melt. In some instances, a "real time" control signal may be provided to the sorting device within 10 minutes, within 5 minutes, within 2 minutes, within 1 minute, within 30 seconds, or within 10 seconds of the sensor beginning an analysis of the melt, or at any value or range of values within such ranges.

Figure 2:
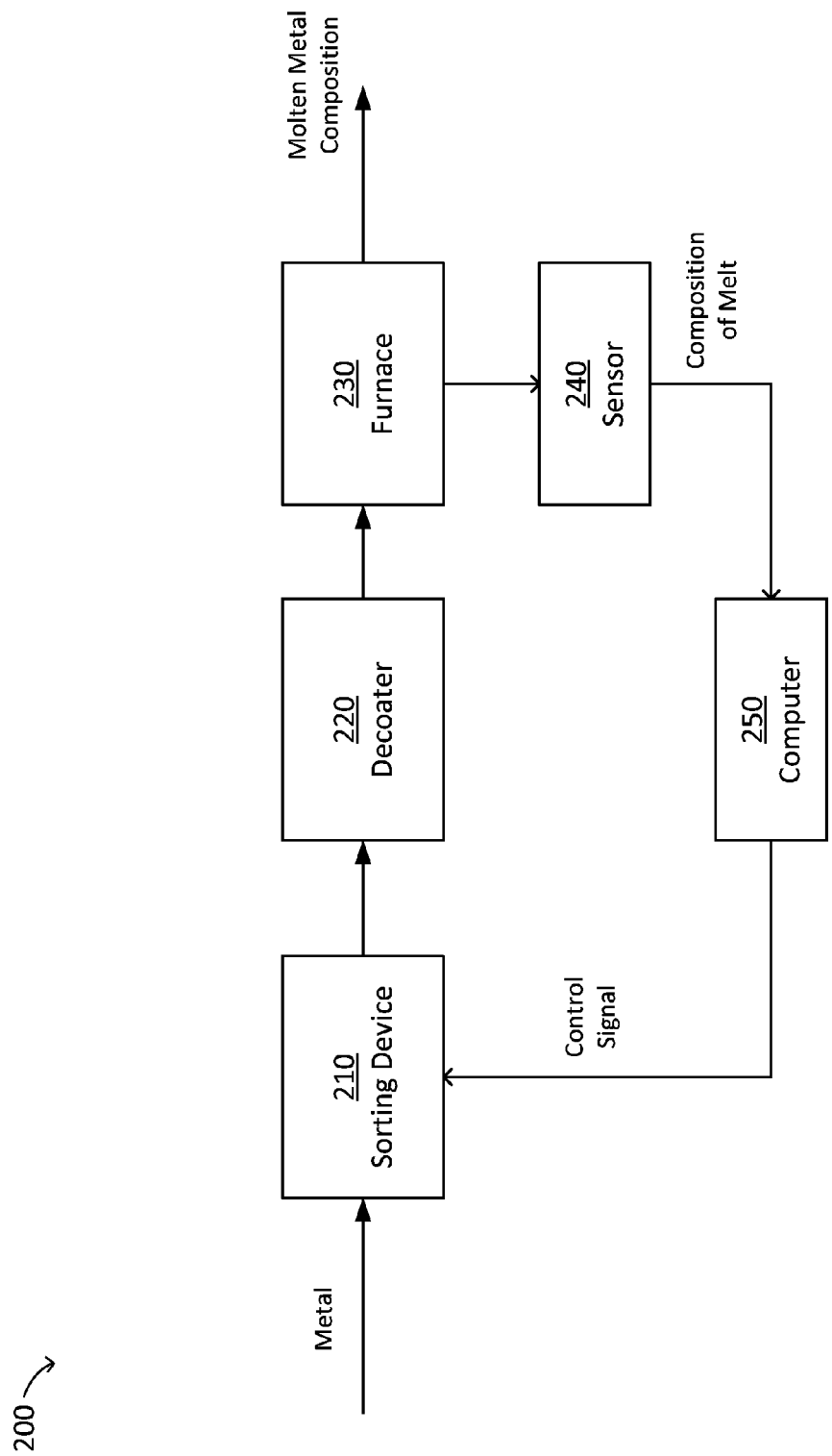
FIG. 2 illustrates a block diagram of an integrated sorting and melting system, according to some embodiments.

FIG. 2 illustrates a block diagram of an integrated sorting and melting system, according to some embodiments. System 200 receives metal as input (e.g., scrap metal) and sorts the metal using sorting device 210. At least some of the metal is provided to decoater 220, which removes organic materials and/or other contaminants from the metal. The decontaminated metal is provided to furnace 230, where it is melted. Sensor 240 analyzes the composition of molten metal in furnace 230 and provides results of the analysis to computer 250. The computer 250 then generates a control signal to sorting device 210, which may indicate how the sorting device is to sort incoming metal in order that the furnace produces a desired chemical composition. Molten metal may be output from the furnace 230, which may be provided to one or more fabrication devices such as a die caster or a foundry (not shown in FIG. 2, but shown in later figures). In some embodiments, molten metal may be provided to a mold and cooled (e.g., at ambient temperature and/or by chilling the mold) to form an ingot (e.g., a specification ingot or sow or similar product).

According to some embodiments, the components of system 200 may be coupled together in a suitable manner to facilitate continuous operation. For instance, conveyors may couple any two or more of the components. In this manner, material may move automatically from one stage of the system to another. In some embodiments, the operation of the illustrated system may be entirely automated. For instance, a first conveyor may move material from the sorting device 210 to the decoater 220, and a second conveyer may move material from the decoater to the furnace 230.

The integrated sorting, melting, and fabrication system of FIG. 2 may represent a single line process for fabricating metal products. System 200 may be housed within a single facility in some embodiments (e.g., a single building, a single room, etc.). More generally, the system may be disposed at a single geographic location and in some embodiments may be operated by a single entity. As mentioned, the components of the system may be coupled together suitably such that material automatically moves from one stage of the system to another.

In at least some embodiments of the present application, system 200 may be configured to produce molten aluminum solely using aluminum scrap as the input to the system. That is, in some embodiments no virgin (or high purity) materials (e.g., virgin aluminum) need be added at any stage of the system. Such operation may facilitate efficient and cost-effective casting of aluminum products.

Metal input to sorting device 210 may comprise any pieces of metal, and may be in the form of scrap or otherwise. As used herein, a "piece of metal" includes any material that is primarily composed of metal, wherein "metal" includes elemental metals (e.g., iron, aluminum), alloys (e.g., brass, steel) and/or semiconducting materials (e.g., silicon). In addition, a "piece of metal" as used herein may include some organic materials or other contaminants as a minor component, or may be pure in some embodiments. According to some embodiments, pieces of metal input to system 200 may include types of scrap known as Zorba (mixed, shredded non-ferrous concentrate (NFC)), Zebra (heavy NFC materials such as zinc, copper, brass, and stainless steel) and/or Twitch (mixed grade aluminum alloys).

According to some embodiments, sorting device 210 may be configured to sort mixed pieces of metal by identifying a classification for each piece of metal. For instance, the pieces of metal may be sorted into one or more desired alloys. In some embodiments, a classification may be a composition (e.g., a piece of metal may be classified as being composed of a specific elemental composition). In other embodiments, a classification may instead be indicative of some aspect of a piece of metal's composition, such as the metal including a component metal in a particular range. For instance, a first classification may be used for pieces of metal including greater than 0.5% iron, and a second classification may be used for pieces of metal having 0.5% iron or less. This is merely one illustrative example, however, as any classification scheme based on aspects of the metal's composition may be in general be employed.

In some implementations, the sorting device may be a binary sorter, and in other implementations may be configured to sort among multiple desired material classes (or groupings) within a single pass. A non-limiting example of suitable sorting technology has been described in U.S. Pat. No. 8,855,809, filed Aug. 31, 2012, issued Oct. 7, 2014, and entitled "Material Sorting Technology", which is incorporated herein by reference in its entirety.

According to some embodiments, sorting device 210 may comprise a conveyer and may direct each piece of metal to one of a plurality of destinations based on an analysis of the piece of metal while it is being conveyed and/or on the control signal received from computer 250. In some implementations, destinations available to sorting device 210 may include the decoater 220 and one or more additional locations where pieces of metal may be directed when it is determined that the pieces are not to be contributed to the melt in furnace 230. In some implementations, destinations may include a plurality of storage containers into which the pieces of metal are directed based on an analysis of the pieces of metal. The storage containers may each be associated with one or more of a plurality of sorting categories, and when a piece of metal is identified as corresponding to one of the sorting categories the sorting device may direct said piece of metal to the associated storage container.

According to some embodiments, sorting device 210 may detect x-rays transmitted from input pieces of metal. In some implementations, the sorting device includes one or more x-ray sources that are directed at the pieces of metal (e.g., as they pass on a conveyer), in addition to one or more x-ray detectors that detect x-rays that pass from the x-ray source(s) and through the pieces of metal. An amount of attenuation of x-rays passing through a piece of metal may be indicative of one or more materials present within the piece of metal, and accordingly may be used to determine whether to direct the piece of metal to decoater 220 (e.g., in addition to the control signal). According to a non-limiting embodiment, a sorter referred to as Z-Sort™ is implemented, and may serve as a component or as all of the sorting device 210. Z-Sort™ is described in further detail below in relation to FIG. 6.

According to some embodiments, sorting device 210 may detect x-ray fluorescence emitted from input pieces of metal. The sorting device may direct x-rays to a piece of metal (e.g., as it passes on a conveyer) and then detect x-ray fluorescence emitted from the piece of metal. Characteristic energies of the fluorescence may be indicative of one or more materials present within the piece of metal, and accordingly may be used to determine whether to direct the piece of metal to decoater 220 (e.g., in addition to the control signal). In some embodiments, sorting device 210 may include one or more x-ray transmission detectors in addition to one or more x-ray fluorescence detectors, which may identify one or more materials in an input piece of metal based on data from both types of detectors.

Figure 7:
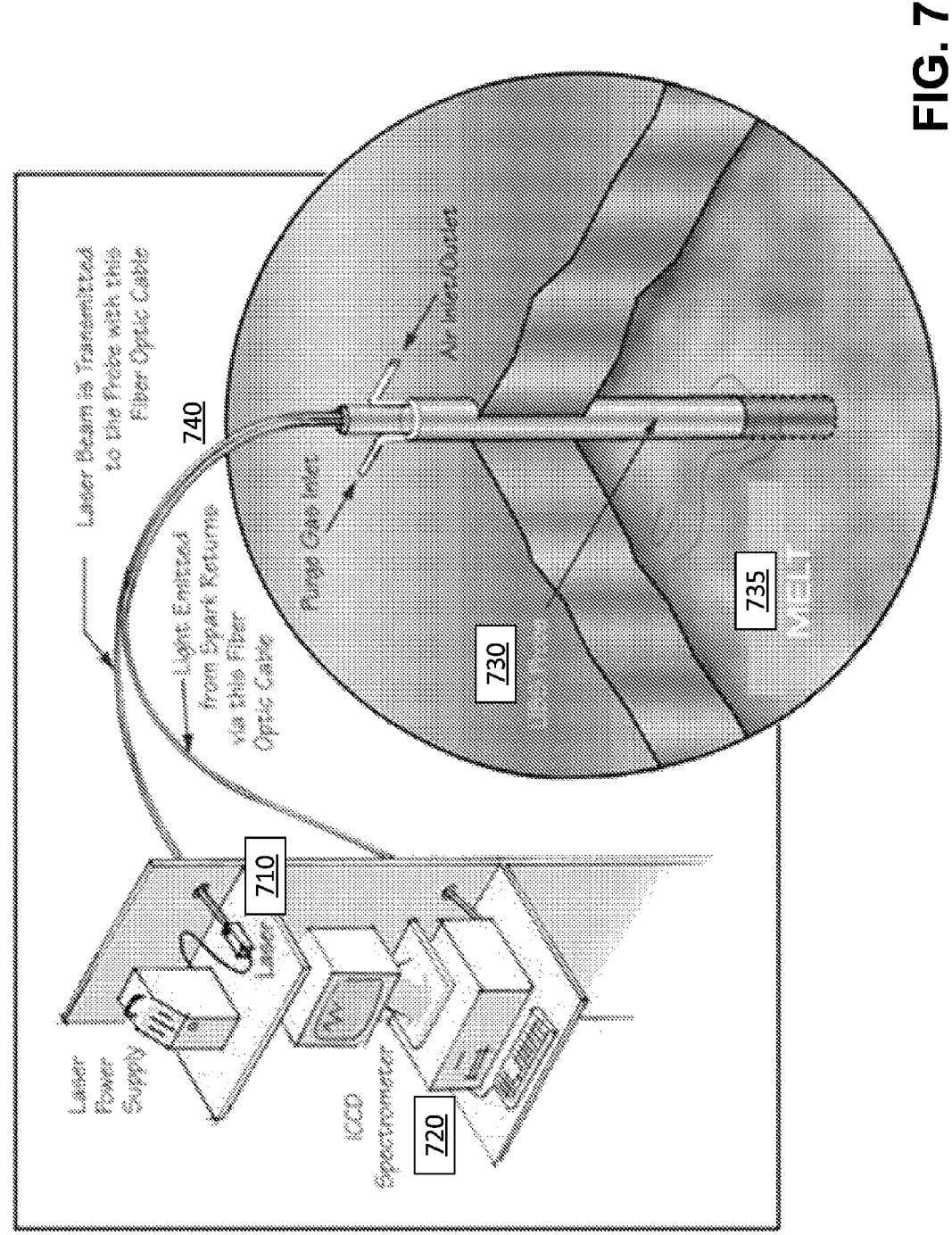
FIG. 7 is a schematic representation of a sensor device suitable for analyzing a molten bath, according to some embodiments.
Figure 8:
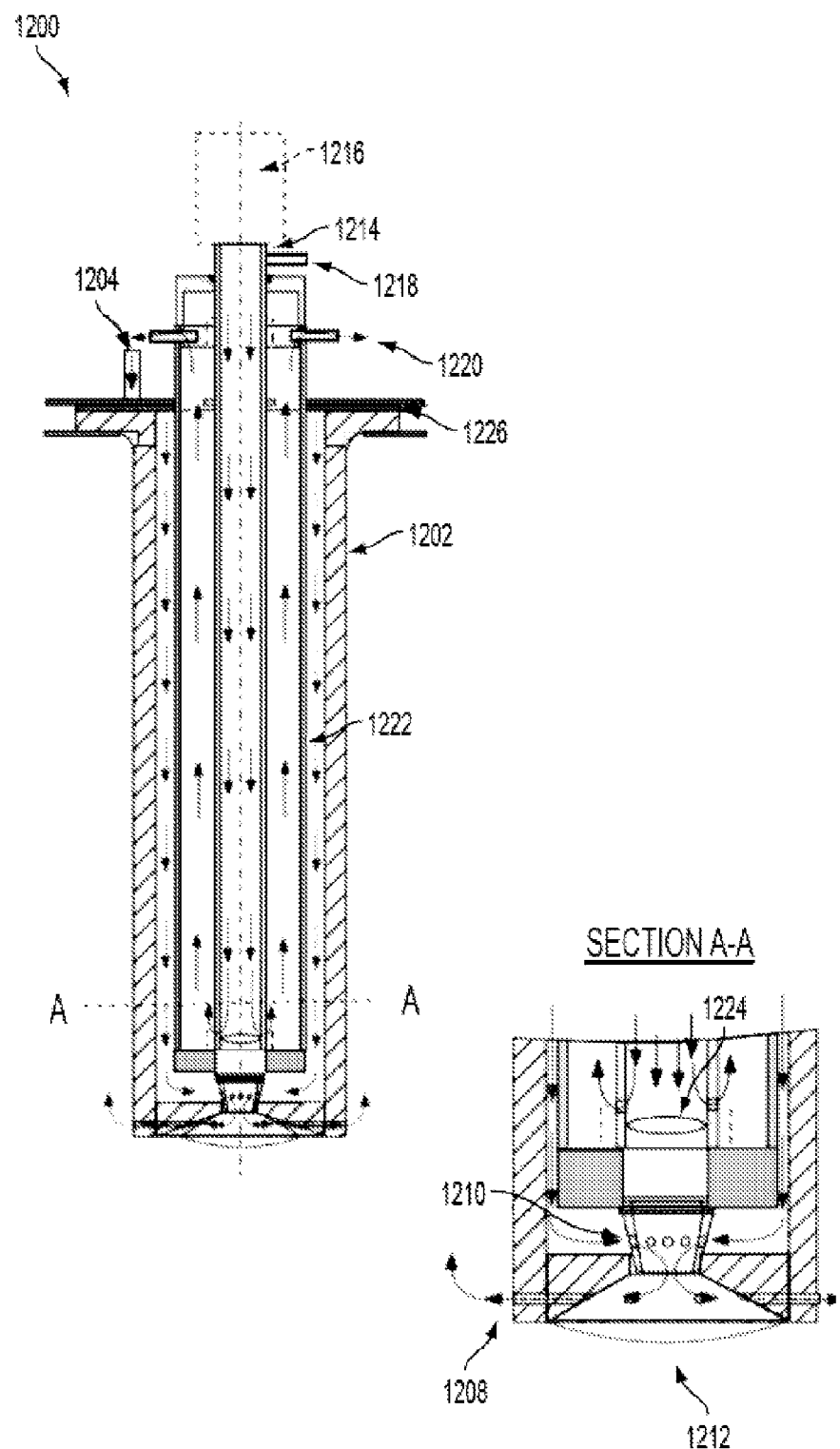
FIG. 8 is a schematic representation of an exemplary immersive LIBS probe, according to some embodiments.
Figure 9:
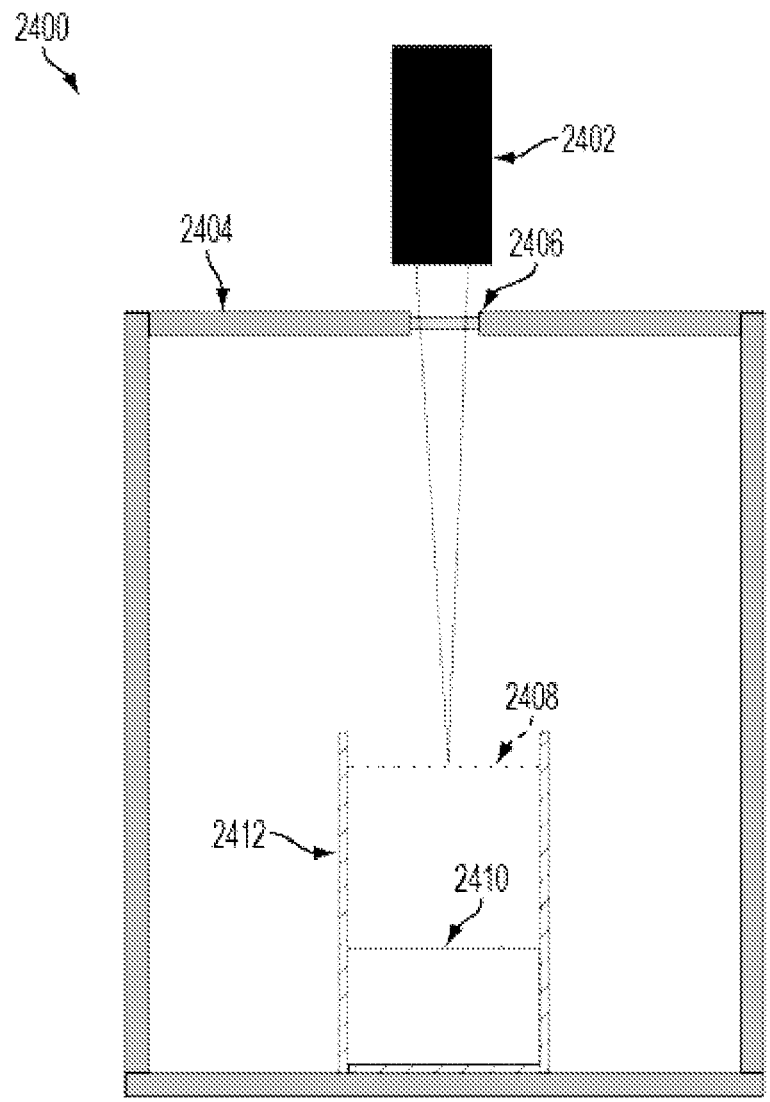
FIG. 9 is schematic illustration of an exemplary LIBS telescope mounted to a vacuum furnace, according to some embodiments.

According to some embodiments, sorting device 210 may include a Laser Induced Breakdown Spectroscopy (LIBS) probe that analyzes input pieces of metal. The LIBS system is described in further detail below in relation to FIGS. 7-9. While FIGS. 7-9 illustrate the use of the LIBS system with respect to analyzing a melt, a LIBS probe may, in some embodiments additionally or alternatively be used to analyze pieces of metal within a sorting device.

Decoater 220 may include any device configured to remove organic materials or other contaminants from input pieces of metal, and to output the pieces of metal substantially intact having removed said contaminants. In some implementations, the decoater 220 may include a heat source configured to be applied to the input pieces of metal and combust any contaminants attached to the pieces. This may heat the pieces of metal yet leave them substantially intact, whilst removing the contaminants. In some implementations, input pieces of metal may be held in place whilst passing through the decoater to facilitate effective removal of contaminants. A non-limiting example of suitable decoating technology has been described in U.S. Pat. No. 6,447,288, issued Sep. 10, 2002, and entitled "Heat Treating Apparatus", which is incorporated herein by reference in its entirety. In some embodiments, the decoater is a vertical floatation decoater.

Decontaminated pieces of metal output from the decoater are provided to the furnace 230, which may include any suitable type of furnace or melter, such as an electric furnace (e.g., an electric induction melter) or a reverbatory furnace (e.g., a fossil-fired reverbatory furnace). In some embodiments, the furnace may include a vessel in which the metals are melted, and in addition may include one or more channels from which molten metal may flow out of the furnace. As discussed above, molten metal output from the furnace may be supplied to one or more metal fabrication devices. When system 200 is operated in a continuous mode, as discussed above, metal may be continuously added to the furnace, and thereby added to the melt, and in addition molten metal may be continuously output from the furnace. As such, metal added to the furnace may be melted and spend a period of time within the furnace before being output as part of the output molten metal.

Sensor 240 may include any device able to analyze the chemical composition of the melt within furnace 240 in-situ. In some embodiments, sensor 240 includes one or more devices configured to perform Laser Induced Breakdown Spectroscopy (LIBS), which is described in further detail below. Briefly, a probe is placed inside the melt and a laser is fired through a fiber optic cable and through the probe. A small amount of melt, at the probe tip, absorbs the laser light producing temperatures sufficiently high to heat and vaporize it into a gaseous plasma state. The resulting plasma emits light that is transmitted through a fiber optic cable and into a spectrometer. This light is spectrally resolved into characteristic peaks, which may be used to uniquely identify the elements in the melt.

Regardless of the type of sensor(s) used as sensor 240, data produced by the sensor(s) is sent to computer 250, which determines whether or not to provide a signal to sorting device 210 indicating how the sorting device should select the metals to be provided to the decoater and thereby the furnace. In some implementations, the computer 250 may be continuously providing control signals to the sorting device; however, based on the data from the sensor 240, the computer may determine whether to alter the control signals that are being sent and/or to provide an additional control signal, either of which may indicate to the sorting device how to perform selection of pieces of metal.

Figure 3:
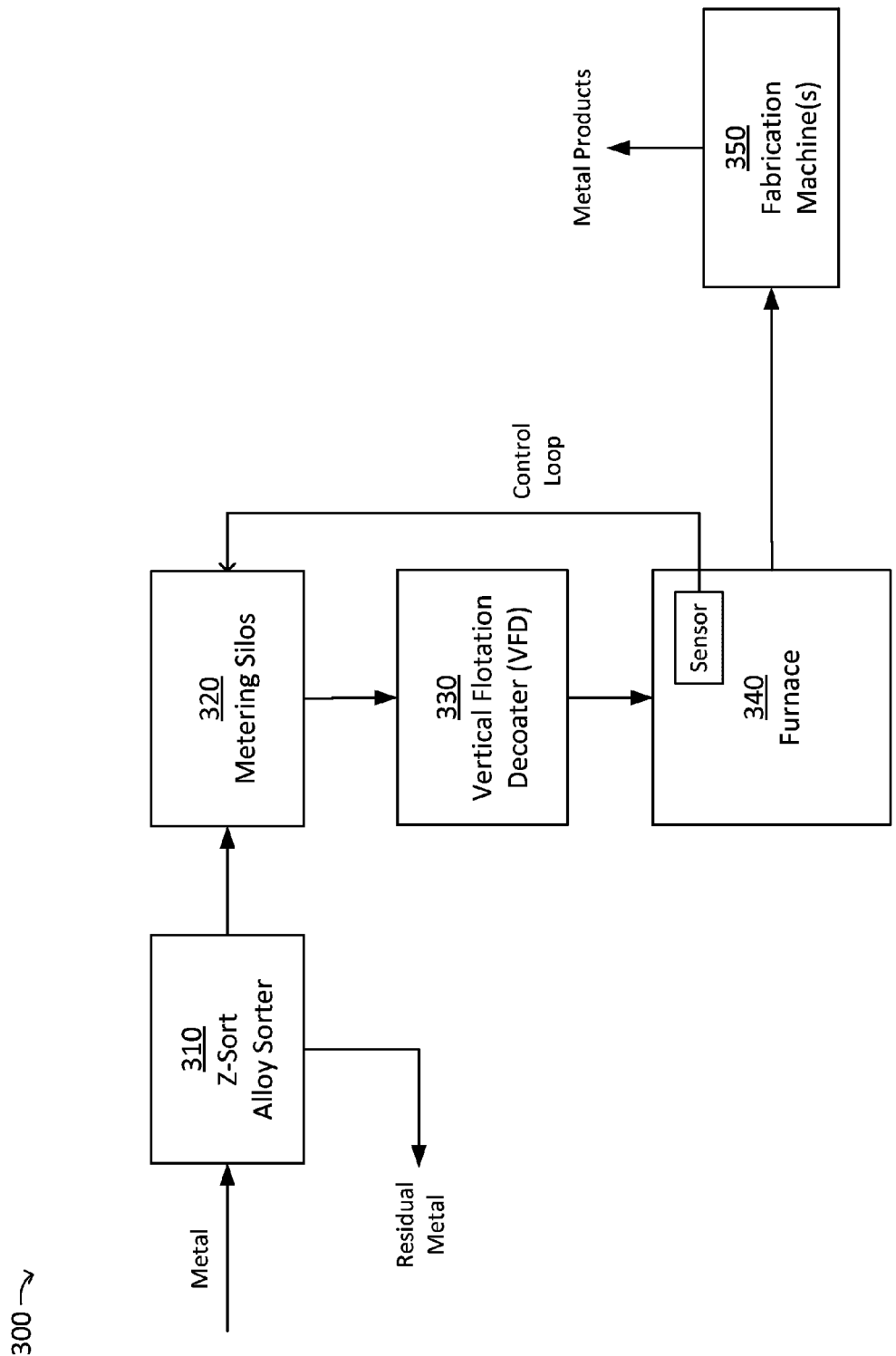
FIG. 3 illustrates a block diagram of an illustrative integrated sorting, melting and fabrication system, according to some embodiments.

FIG. 3 illustrates a block diagram of an illustrative integrated sorting, melting and fabrication system, according to some embodiments. In system 300, pieces of metal are provided to a Z-Sort Alloy Sorter 310, which sorts the metal into a number of metering silos 320. Any metals that the sorter 310 determines are not to be provided to the metering silos are instead output as residual metal. Pieces of metal from the metering silos 320 are selectively output to vertical floatation decoater (VFD) 330, which removes organics and other contaminants from the pieces of metal. The pieces of metal are then provided to furnace 340, which melts the metals. Molten metal is output from the furnace to one or more casting machines 350, which casts metal products from the molten metal. Furnace 340 includes a sensor that provides data to the metering silos 320, which perform selective output of metals from the silos based on this data.

The Z-Sort™ Alloy Sorter 310 was discussed briefly above, and is described in further detail below in relation to FIG. 6. The sorter 310 may determine, for each piece of metal input to the sorter, with which of a plurality of sorting categories the metal should be associated. For instance, the sorter may receive scrap metal as input and may identify whether each piece of scrap metal should be sorted as Zorba, Zebra, Twitch, or as none of these categories. A piece of scrap metal identified as Zorba, Zebra or Twitch may be deposited into one of three metering silos in metering silos 320, each of the three silos corresponding to one of Zorba, Zebra or Twitch. In this example, a piece of scrap metal that is not identified as Zorba, Zebra or Twitch may be output as residual metal (and not added to a metering silo).

Pieces of metal located within the metering silos may be selectively output to the decoater 330 based on a control signal received from the sensor within furnace 340 (either directly from the sensor or via a computer (not pictured)). Metals from multiple silos may be output simultaneously, and each silo may be configured to output metal with an independently controlled rate. In response to this control signal, the metering silos may select one or more of the silos from which to output pieces of metal. As discussed above, the control signal may be indicative of one or more metals identified as desirable to add to the melt in the furnace (e.g., based on a target melt composition), and as such the metering silos may output pieces of metal from silos associated with sorting categories that contain at least one of the one or more metals.

In some implementations, the metering silos may include material that is added manually to one or more silos in addition to pieces of metal automatically added to silos by the sorter 310. For instance, one of the silos may contain silicon that was manually added to the silo, and other silos may contain metals sorted by sorter 310. In this example, small amounts of the silicon may be output from the silos to the decoater 330 in addition to metals from one or more of the other silos in order to achieve a desired melt composition.

In the example of FIG. 3, pieces of metal that have been selected to add to the melt pass through a vertical flotation decoater (VFD). Pieces of metal are fed into the top of a VFD, which then drop to the bottom of the VFD. As the pieces fall, high velocity gases traveling upwards in the VFD serve to both slow the descent of the pieces and to mechanically remove contaminants from the pieces. The gases are of sufficiently high temperature that the contaminants are vaporized. These vapors are passed to a combustion chamber where they are combusted, allowing the VFD to use the heat produced to drive the VFD process. If the organic content of pieces of metal provided to the VFD is around 7% by weight, then the process becomes autothermic, and no other fuel is required (except for a safety pilot light in some non-limiting embodiments). In some implementations, the gases impose a variable drag force on a piece of metal and equilibrium may be reached when the weight of the piece equals the gas drag force, causing the piece to hang and not fall. This greatly increases the amount of time that a piece of metal spends in the VFD, thereby allowing the piece to be effectively decoated.

According to some embodiments, the VFD may have a conical shape, which produces a variation in gas velocity, and therefore drag force, with height above the base of the cone. In such a configuration, the gas velocity is highest at the bottom of the cone (the smallest cross sectional area) and slower at the top of the cone (where the cross sectional area is larger). This provides a variable drag force that will accommodate a large range of sizes of input pieces of metal. In some embodiments, the cone size of the VFD is determined by the expected types of metals (e.g., shapes of scrap) and their aerodynamics. In some embodiments, the VFD cone has a roughly 0.5 m diameter gas inlet, is 4.5 m high, and has a gas outlet diameter of 1.3 m. However, these numbers may differ depending on scrap type, scrap feed rate, and/or customer preferences, among other possible factors.

According to some embodiments, the gas velocity within the VFD is around 9 m/s, leading to convective heat transfer coefficients of about 143 $W/m^2K$. This may allow decoating to occur rapidly at lower gas temperatures, which in turn may provide higher metal yield and lower energy use. According to some embodiments, the oxygen content in the cone is kept below 12%, the lower flammability limits of typical organic contaminants, so that the contaminants are vaporized and do not substantially flame or combust. This avoids a major metal loss typical of conventional decoaters. If the organics burn rather than vaporize, they oxidize the metal they are on, resulting in large metal losses. The VFD avoids this in at least some embodiments. In some embodiments the VFD may include a cyclone to remove fine particulates and/or a gas cooler to reduce the temperature of the gas going into the cone.

In the example of FIG. 3, pieces of metal exiting the VFD enter the furnace 340, where they are melted. Molten metal output from the furnace is provided to one or more fabrication machines 350, which may perform any suitable high temperature forming technique or techniques, such as those utilizing extrusion or sheet techniques. For instance, fabrication machine(s) 350 may include any number of foundries, die casters, extruders, friction forming devices or rolling mills. In some embodiments, fabrication machine(s) 350 may include one or more devices that may produce metal ingots from the molten metal, such as, but not limited to, a mold.

In some embodiments, system 300 may be configured to operate in a continuous mode such that metal is continuously being input into the sorter 310 and metal products are continuously being produced from fabrication machine(s) 350. In this mode of operation, the throughput of each stage (sorting, decoating, melting and fabrication) may be sufficiently similar to one another so as not to cause too great a backlog at any stage, by contrast to a system in which each individual stage is independently developed and operated without consideration of any other stage of the system. For instance, the sorter may sort pieces of metal into the metering silos 320 faster than metal is being output from the silos, but this may be acceptable so long as the rates do not mismatch to an extent and/or for a sufficient length of time that the silos overflow. Similarly, the furnace may output molten metal at a slower rate than it melts metal from the VFD 330 so long as there is sufficient space within the furnace to contain the molten metal. As such, the throughput of each stage may be controlled to ensure continuous operation, but this does not necessarily mean that the throughputs are always identical to one another.

In some embodiments, system 300 may be configured to operate in stages such that pieces of metal are pre-sorted into the metering silos 320 (by sorter 310 or otherwise), and subsequently, the decoater, furnace and fabrication machine(s) operate in a continuous mode using the pre-sorted pieces of metal as input. Thereby the sorting process may operate independently of the remainder of the system. In some embodiments, system 300 may be configured such that, at some times, the sorting process operates to pre-sort pieces of metal into the metering silos while the remainder of the system does not operate, and at other times, all stages of system 300 may operate. For instance, system 300 may be operated to pre-sort pieces of metal for a period of time, and subsequently the system may be operated to sort additional pieces of metal while also decoating, melting and fabricating using the remainder of the system.

System 300 may include one or more controllers, which may include one or more computers (such as the computing device shown in FIG. 10), that control the operation of the various stages of system 300. Such controllers may be provided as a stage of the system separate from the sorting, melting and fabrication stages, and/or may be provided within one of these stages. For instance, a central monitoring system may monitor the operation of the sorter 310, the silos 320, the decoater 330 and the furnace 340 and adjust throughput, start/stop and/or otherwise adjust operation of the respective unit. Alternatively, or additionally, the furnace 340 may include one or more controllers that receive sensor data from the sensor within the furnace and perform processing of the sensor data. In some embodiments, such a monitoring system may also generate the control signal provided to the metering silos 320 in response to measurements from the sensor within furnace 340.

Figure 4:
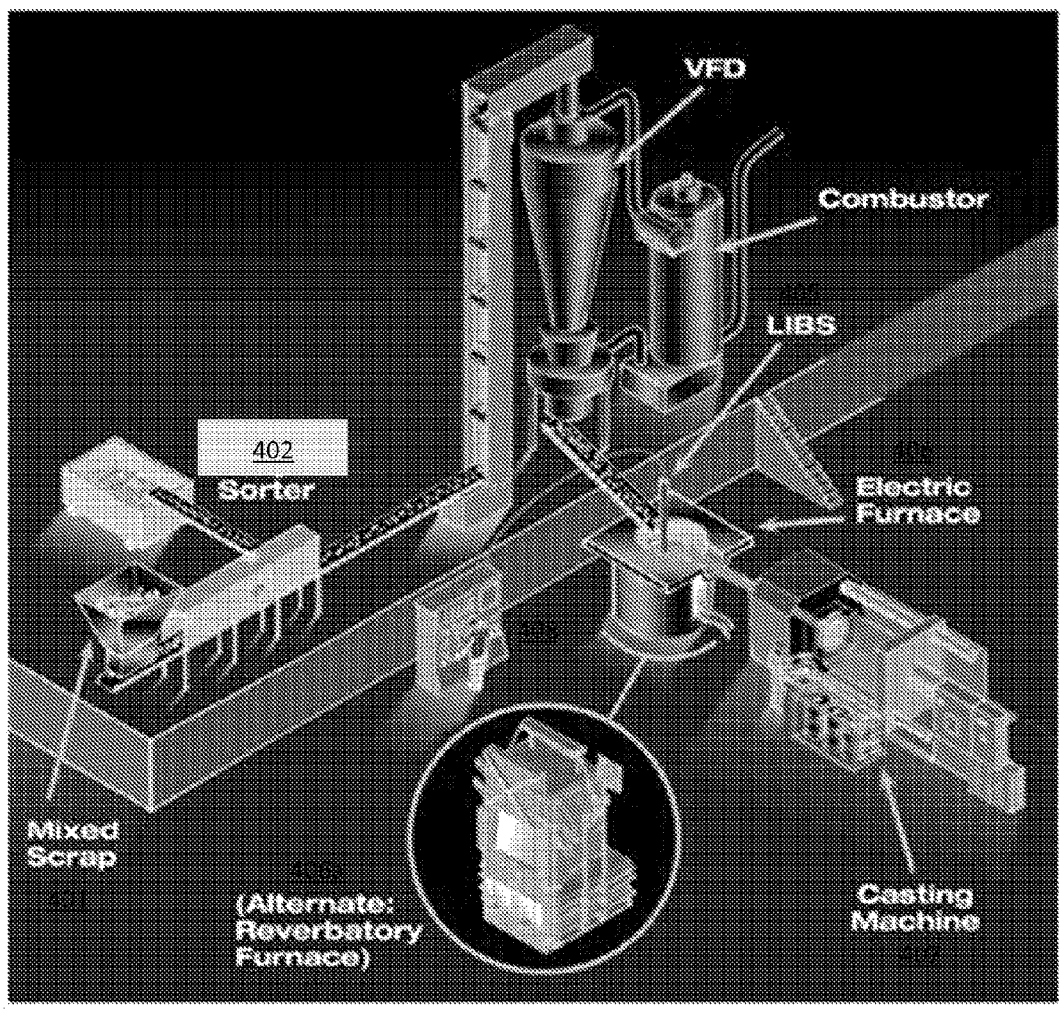
FIG. 4 illustrates an implementation of an illustrative integrated sorting, melting and fabrication system, according to some embodiments.

FIG. 4 illustrates an implementation of an illustrative integrated sorting, melting and fabrication system, according to some embodiments. In illustrative system 400, mixed scrap 401 may be input to a sorter 402, moved by conveyor to a VFD 403, proceed to a furnace 406 (e.g., an electric furnace, or alternatively a reverbatory furnace 406a), where it is melted to form a molten bath, and then provided to a casting machine 407. The VFD 403 includes a combuster which combusts contaminants removed from pieces of metal in the VFD, as described above. The furnace 406 includes a LIBS system 405 that analyzes the melt within the furnace 406. In the example of FIG. 4, the LIBS system 405 that analyzes the melt within furnace 406 is coupled to a control system 408 (pictured being operated by a user in FIG. 4). As described above, such a control system may control the operation of one or more stages of the system, including, but not limited to, controlling how the sorter 402 performs sorting of pieces of metal in response to an indication of the composition of the melt in furnace 406.

Figure 5:
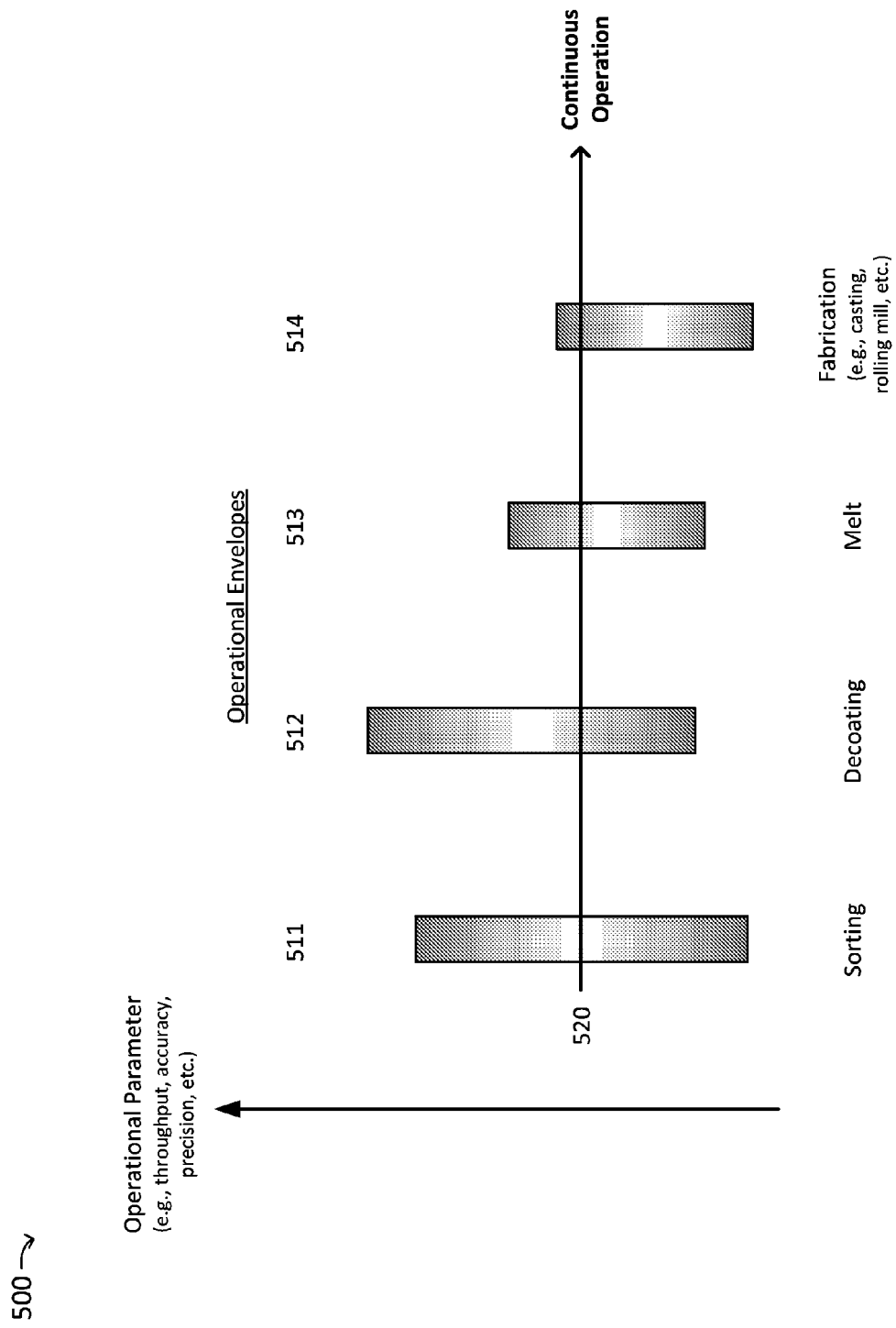
FIG. 5 illustrates operational envelopes of various stages of an illustrative integrated sorting, melting and fabrication system, according to some embodiments.

FIG. 5 illustrates operational envelopes of various stages of an integrated sorting, melting and fabrication system, according to some embodiments. As discussed above, in some embodiments an integrated sorting, melting and fabrication system as described herein may be operable in a continuous mode. In such embodiments, an understanding of the behavior of each of stage of the system may facilitate successful continuous operation (e.g., maintainable and/or profitable continuous operation).

For instance, a sorting device may be operated at various speeds while producing as an output a certain amount of materials of interest (e.g., identified as being desirable for contribution to the melt) and a certain amount of materials that are not of interest (false positives). The rates of correctly identified materials output (true positives) and materials erroneously output (false positives) may each depend on the speed at which the sorter is operated, in addition to the types of materials that are sought for identification (since some materials may be more difficult to identify than others). In addition, the throughput of the sorter (the amount of material that the sorter outputs in a given time) may differ from a speed at which the sorter analyzes material (e.g., if the fraction of material that is selected is less than 1). As such, selection of a speed for the sorting device may depend on these various factors in addition to assessments of the system as a whole.

In order to determine how to efficiently operate each stage of the system, it may be may be central to understand how the speed of each stage can affect the net performance of the whole system. As discussed above, when operating the system in a continuous mode, the throughput of each stage may be substantially the same. Accordingly, since the throughput of a stage may be a function of how quickly and accurately each stage performs, an understanding of all stages may be central to determining how to operate each stage. For instance, if the melter can only be operated within a narrow range of throughput values, it may be irrelevant for continuous operation that the decoating device may be operated with much higher throughput, since even if it were operated as such, the downstream melter would not be able to keep up with such an incoming material rate (and might need to be halted to avoid overflow, for example).

FIG. 5 depicts one example of this type of analysis for continuous system operation, in which each of the sorting, decoating, melting and fabrication stages may be operated with a range of values of an operational parameter such as throughput or accuracy. In order to determine how to operate the system in a continuous mode, a value of the operational parameter 520 that fits within the envelopes 511-514 is selected. It will be appreciated that each of the stages of the system may exhibit a range of viable values of each operational parameter that may differ for each operational parameter, and that therefore an analysis, such as that depicted in FIG. 5, may be performed for multiple operational parameters before a consistent way to operate the system in a continuous mode is determined. In addition, there may be a complex relationship between values of an operational parameter for one stage and values of another operational parameter for another stage, which may additionally be considered in determining how to operate the system in a continuous mode.

Figure 6:
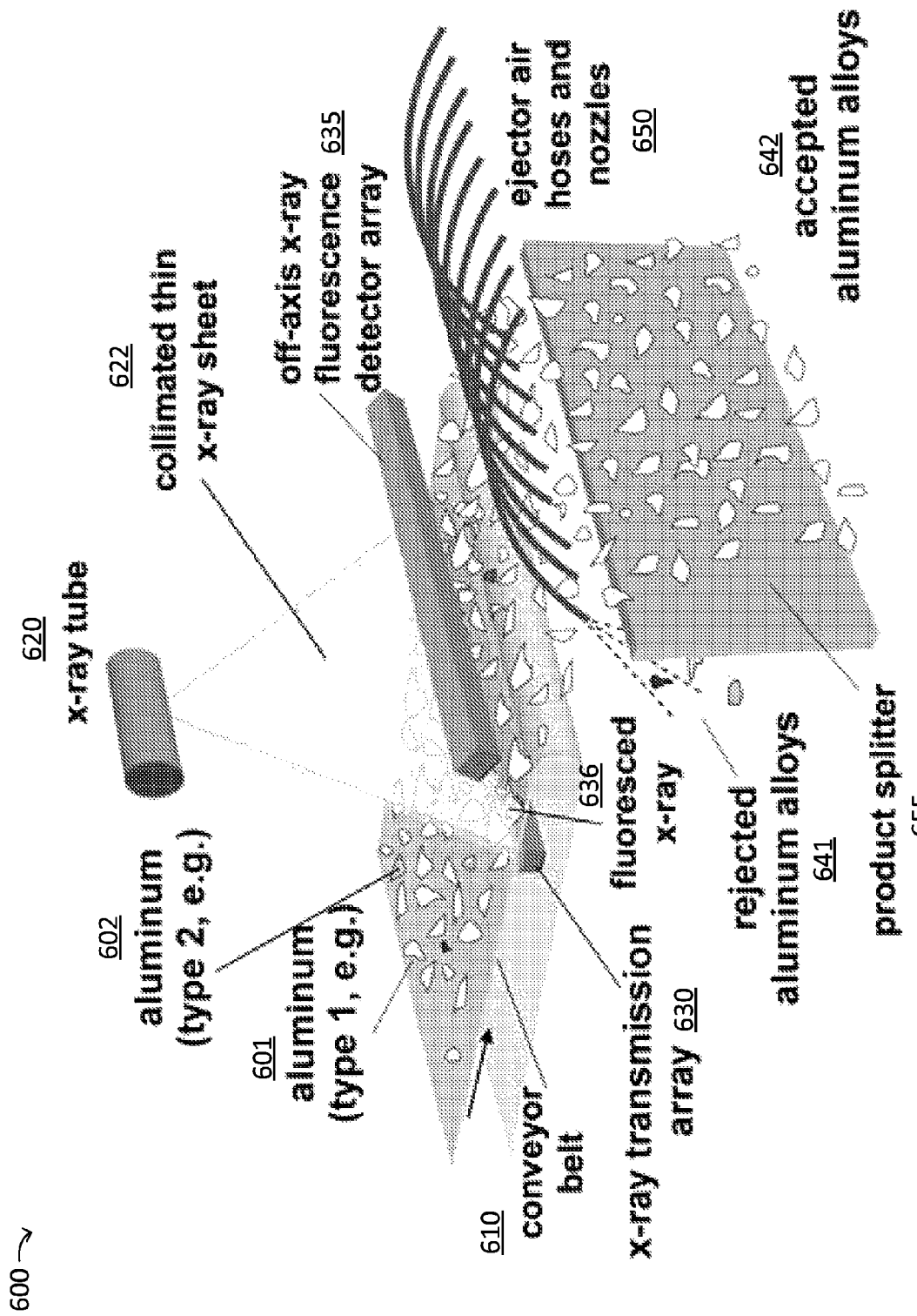
FIG. 6 illustrates a sorting apparatus configured for use in an integrated sorting, melting and fabrication system, according to some embodiments.

FIG. 6 illustrates a sorting apparatus configured for use in an integrated sorting, melting and fabrication system, according to some embodiments. In particular, FIG. 6 illustrates a sorting apparatus that implements the Z-Sort™ approach to sorting materials, discussed briefly above.

In the example of FIG. 6, mixed aluminum scrap pieces 601 and 602 are distributed across a wide, high-speed conveyor belt 610 and passed through a sensing zone where they are interrogated by a collimated thin sheet of x-rays emitted from x-ray tube 620 and collimated by sheet 622. The x-rays pass through the scrap pieces and interact with a stacked, x-ray transmission array 630 comprised of, for example, 1.6 mm-pitch x-ray scintillators that acquire x-ray transmission data at two different energy levels. In addition, x-rays 636 fluoresced from the scrap pieces may be detected by x-ray fluorescence (XRF) detector array 635. Based on measurements from one or both of detector arrays 630 and 635, ejector air hoses and nozzles 650 direct air to aluminum scrap pieces that are identified as not being accepted 641 (based on a classification of the scrap). Scrap that is acceptable 642 passes on the opposing side of product splitter 655.

Broadly referred to as dual energy x-ray transmission (DXRT), the measurement of transmitted x-rays over two energy ranges permits the sorting apparatus to conduct a binary sort, based on the effective atomic number $Z_{eff}$ of the material, which may be calculated using an approximation of effective Z-number by power law considering the fraction of electrons each element contributes to the alloy matrix. Thus, high average atomic number materials may be separated from low average atomic number materials. For example, alloys high in Fe and Cu will have higher average atomic numbers than alloys with low Fe and Cu. Thus, the DXRT sensor may be used to detect this difference and, for example, reject the high Fe/Cu material while sending the desired material on to be decoated and melted. Pneumatic or mechanical ejectors are used to separate the materials based on the desired sort.

According to some embodiments, Z-Sort™ provides an advantage of detecting attachments and inclusions within scrap, such as bolts remaining in aluminum castings or screws/rivets in wrought aluminum products. Since Z-Sort™ looks through each piece, it is possible to identify the presence of inclusions or attachments, even if they are not visible upon surface inspection. A sorting device implementing Z-Sort™ can then divert these pieces into an appropriate destination when the pieces would otherwise be incorrectly classified as low-Z or "clean" aluminum alloys.

The theory behind Z-Sort™'s operation begins with the Beer Lambert-Law for x-ray transmission:

$$T(e) = I_{tr}(e)/I_o(e) = \exp\{-\mu_z(e) \cdot t\}$$

where e is the energy of the x-ray flux, $I_{tr}(e)$ is the transmitted flux, $I_o(e)$ is the incident flux, $\mu_z(e)$ is the linear attenuation coefficient of the material with atomic number Z at energy e, and t is its thickness. Taking the negative natural logarithm of both sides, a linear function relating x-ray absorbance to the attenuation coefficient and thickness of the material is obtained:

$$A_z(e,t) = -\ln(T(e)) = -\ln(I_{tr}(e)/I_o(e)) = \mu_z(e) \cdot t$$

where $I_{tr}(e)/I_o(e)$ is the ratio of transmitted to incident flux (absorbance) and represents the measurement made by the sensor array. If two specific energies, $e_1$ and $e_2$ are chosen that closely approximate the responses of both the "high energy" and "low energy" sensors in the dual energy array, thickness can be eliminated as a variable and we are left with a linear function relating the measured x-ray transmission to a parameter that depends on $e_1$, $e_2$, and the effective atomic number of the material:

$$-\ln(T(e_1)) = -\ln(T(e_2)) \left[ \frac{\mu(e_1)}{\mu(e_2)} \right]_Z$$

As discussed above, a sorting device implementing Z-Sort™ may be used to sort scrap into desired sorting categories. For example, a sorting device implementing Z-Sort™ may be used to sort Zorba (mixed, shredded non-ferrous concentrate (NFC)) into Zebra (heavy NFC materials such as zinc, copper, brass, and stainless steel) and Twitch (mixed grade aluminum alloys). According to some embodiments, a sorting device implementing Z-Sort™ may be operated at high speeds, for example running at a scrap throughput between 900 and 1,800 kg/hr. Processing of each scrap piece may last 10 to 100 milliseconds, for example when sorting Zorba.

In some embodiments, Z-Sort™ may be used to sort Twitch, thus avoiding the addition of expensive primary aluminum in the integrated sorting, melting, and casting system. Generally, Twitch consists partly of A380, the automobile's workhorse cast alloy, along with lesser amounts of many other cast and wrought alloys such as A356 and A7075. Thus, the sorting system may be used to sort among such alloys.

In some embodiments, Z-Sort™ may be used to sort more valuable aluminum alloys (e.g., those that can be used in automobile structural components) from less valuable ones. For instance, High-Z, aluminum alloys (e.g., containing increasing amounts of Fe, Cu, or Zn) from both wrought and cast streams may be separated from high value, Low-Z alloys (e.g., Al, Si, Mg, only).

In some embodiments, Z-Sort™ may be operated as a binary sort, in which a single target alloy is produced. If a second target alloy is needed, the rejected material may be sent through Z-Sort™ a second time with the sorting algorithms adjusted for the new target alloy. In alternative embodiments, multiple alloys may be sorted simultaneously in a single pass.

In some embodiments, an x-ray fluorescence (XRF) line scan camera may be used in addition to the XRT sensor array in Z-Sort™. For example, XRF line scan camera technology branded ChipSort™, and available from wTe corporation of Bedford, Mass., uses many individual XRF detectors—each a single channel—which does not require material singulation and, instead, can accept material in the same way that the XRT sensor array can. The XRF line scan camera may be used to generate XRF spectra, the peaks of which may be used to classify a material. For example, data representing normalized XRF counts versus binned energy values may be generated, and the peaks of the spectra may allow for classification of scrap pieces. As a non-limiting example, an XRF line scan camera may be used to separate Z7075 from A380.

According to some embodiments, a physical combination of DXRT and XRF may be implemented using the same broadband x-ray source. In some such embodiments, XRT may be used to provide high-speed discrimination between high-Z and low-Z effective alloys, and XRF may be used to further refine that sort based on a qualitative measure of Fe, Cu, and Zn compositions, as a non-limiting example.

In some embodiments, conveyor belt width of the sorter may impact sorting speed. The belts may range from, for example, 0.5 meters (e.g., 0.7 meters) to 2.5 meters. Also, multiple, parallel Z-Sort™ lines may be implemented, increasing the scrap throughput by the number of additional lines. As the scrap throughput increases, either the belt width or the number of modules must be increased. As a non-limiting example, at 1,400 kg/hr, with a belt speed of 106 m/min, the dimensions may be about 6 to 9 m long and 1.2 m to 1.5 m wide.

While various embodiments have been described as using the Z-Sort™ technology and/or the ChipSort™ technology, it should be appreciated that the various aspects of the present application are not limited to using these particular technologies. Rather, any suitable sortation equipment may be used, including alternative suitable XRF and DXRT technology. The examples of Z-Sort™ technology and ChipSort™ technology are provided for purposes of illustration.

FIG. 7 is a schematic representation of a sensor device suitable for analyzing a molten bath, according to some embodiments. As discussed above, one type of sensor that may be used to measure the chemical composition of molten metal in-situ is a Laser Induced Breakdown Spectroscopy (LIBS) sensor, which deploys a laser 710 and spectrometer 720 as shown in FIG. 7. According to some embodiments, a LIBS sensor may aid an integrated sorting, melting and fabrication system by providing rapid (and in some cases, instant) feedback as to the needs of the melt prior to fabrication. A non-limiting example of a suitable LIBS probe is the "LIBS for Melt Diagnostics" probe sold by Melt Cognition, LLC of Bedford, Mass.

In the illustrative LIBS system 700, a probe 730 is placed inside the melt 735 and the laser is repetitively fired through a fiber optic cable 740 and through the probe. A small amount of melt, at the probe tip, absorbs the laser light producing temperatures sufficiently high to heat and vaporize it into a gaseous plasma state. The resulting plasma emits light that is transmitted through fiber optic cable 740 and into spectrometer 720. This light is spectrally resolved into characteristic peaks, which uniquely identify the elements in the melt. In addition, the peaks' amplitudes are proportional to the concentrations of each element present. While, in the example of FIG. 7, a fiber optic cable 740 is used to guide the laser, in some embodiments, a LIBS system may instead fire the laser directly into melt 735.

In some embodiments, a dross layer of the melt may be sufficiently small, representing a thin oxide layer, that the LIBS system probe may not need to be immersed in the melt but could interrogate the melt from above and use cleaning shots to temporarily remove the thin oxide layer. For instance, this could be performed using a single laser or a faster double pulse laser.

In some embodiments, fountain pumping may be used. In such embodiments, a pump is used in which the molten metal is elevated from the main bath in a fountain. The LIBS probe may interrogate the flowing metal from a distance of about two feet which then eliminates the need to immerse the probe and thus reduces or entirely eliminates alkali metal segregation.

In some embodiments, alkali metal segregation may be reduced or eliminated entirely by periodically pushing the melt away from the immersed probe using high pressure nitrogen which disrupts the gas/metal boundary. A diode pumped laser, which is air cooled, may be used in such embodiments. Alternatively, a water cooled laser head may be placed on the probe so long as the water is prohibited from impinging on the melt.

FIG. 8 is a schematic representation of an exemplary immersive LIBS probe, according to some embodiments. In the example of FIG. 8, an immersive LIBS probe 1200 is shown with both a cross-section view and a close-up section view of the tip of the probe 1200, cutaway along the line labeled A-A. In this example, the probe 1200 comprises three concentric tubes. The centermost tube 1214 houses the system optics, including lens 1224, and is coupled to laser optics 1216. Cooling gas is input through inlet 1218 and passes down the center of the optics tube 1214 and exits through outlet 1220 between the optics tube and a stainless steel heat shield 1222. The entire probe 1200 is protected from chemical attack by a housing, such as silicon-carbide sheath 1202, and may be sealed with a graphite seal 1226.

Nitrogen or argon gas may be introduced through a port 1204 at the top of the probe 1200, and circulates through conduits 1206 between the ceramic sheath 1202 and the steel heat shield 1222. The purge gas then passes through holes, such as hole 1208 shown in the close-up view, in the centering cone 1210 and fills an area at the bottom of the probe 1200, forming a stable, molten metal interface, which can be sampled by the laser. The purge gas exits the probe 1200 into the molten metal through radial holes in the ceramic sheath 1202, generating a bubble 1212 that may serve both to assist in controlling the position of the metal surface relative to the laser, and to agitate the metal ensuring that fresh material is continually cycled into the target area.

In some embodiments, as shown in the example of FIG. 9, a LIBS telescope may be mounted to a vacuum induction furnace, electron beam melter, or other similar furnace. FIG. 9 illustrates a telescopic LIBS system 2400 in which a LIBS sensor 2402 is mounted on top of a vacuum furnace 2404. A UV transmissive viewport 2406 may be used to seal the chamber while allowing the laser pulses and plasma light to pass between the sensor 2402 and a melt in a crucible 2412. The foci of the laser and collection optics may be adjusted to compensate for the changing height of the metal, for example, heights 2408 and 2410, as the furnace 2404 is charged.

In some embodiments, it may be desirable to keep the viewport 2406 clean while making LIBS measurements. One way to accomplish this is to employ a mechanical shutter (not visible in FIG. 9) in front of the viewport 2406 that is open when the laser is operating and closed at other times. Additionally or alternatively, a burst or continuous flow of an inert gas (not visible in FIG. 9) such as Argon may be directed towards the inside of the viewport 2406 to clean it before and during measurements. Another approach is to use a mechanical wiper (not visible in FIG. 9) to periodically clean the inside of the viewport 2406. The wiper may be actuated manually or automatically.

Figure 10:
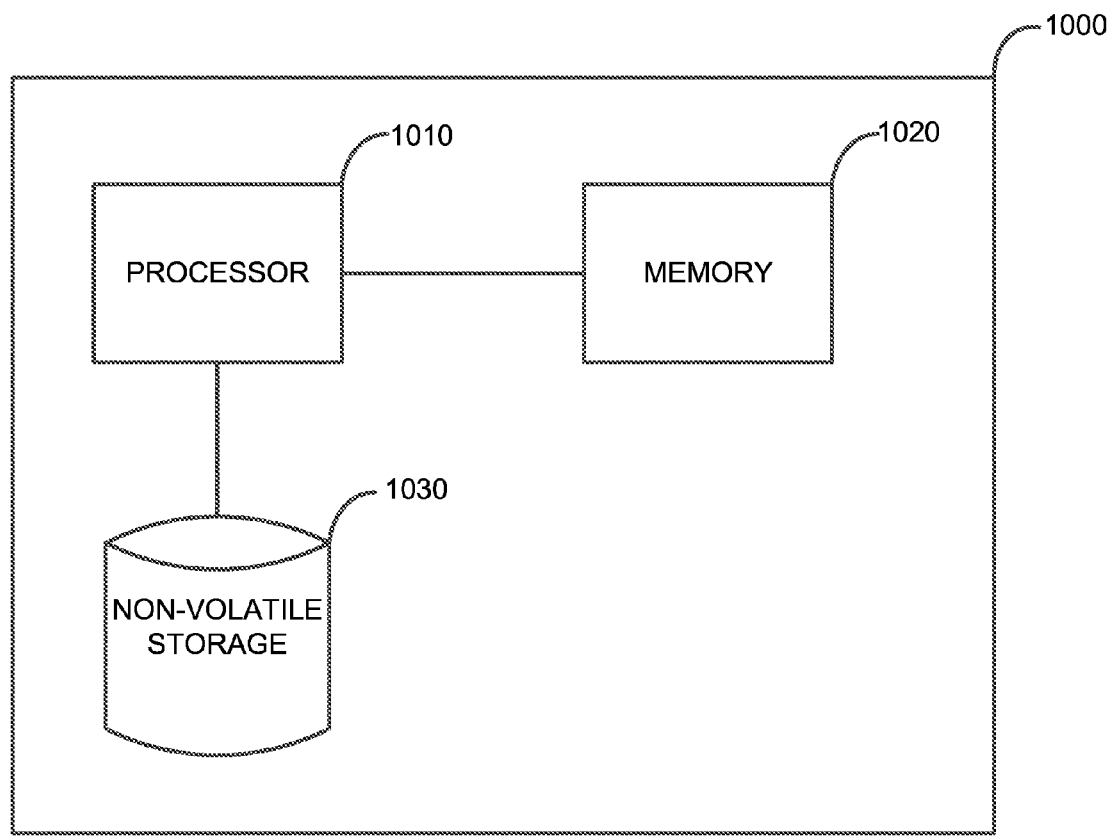
FIG. 10 illustrates an example of a computing system environment on which aspects of the invention may be implemented.

An illustrative implementation of a computer system 1000 that may be used to implement one or more of the techniques for operating an integrated metal sorting, melting and fabrication system is shown in FIG. 10. The computer system 1000 may include one or more processors 1010 and one or more non-transitory computer-readable storage media or storage devices (e.g., memory 1020 and one or more non-volatile storage media 1030). The processor 1010 may control writing data to and reading data from the memory 1020 and the non-volatile storage device 1030 in any suitable manner, as the aspects of the invention described herein are not limited in this respect. To perform the functionality and/or techniques described herein, the processor 1010 may execute one or more instructions stored in one or more computer-readable storage media (e.g., the memory 1020, storage media, etc.), which may serve as non-transitory computer-readable storage media storing instructions for execution by the processor 1010.

In connection with techniques for operating an integrated metal sorting, melting and fabrication system described herein, code used to, for example, generate control signals, obtain sensor readings, monitor devices within the system, etc. may be stored on one or more computer-readable storage media of computer system 1000. Processor 1010 may execute any such code to provide any techniques for controlling aspects of an integrated metal sorting, melting and fabrication system described herein. Any other software, programs or instructions described herein may also be stored and executed by computer system 1000. It will be appreciated that computer code may be applied to any aspects of methods and techniques described herein. For example, computer code may be applied to generate a control signal based on a comparison of a measured composition of a bath of molten metal with a target molten metal composition.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device encoded with one or more programs that, when executed on one or more computers or other processors, implement some of the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of one or more embodiments described herein need not reside on a single computer or processor, but may be distributed in a modular fashion among different computers or processors to implement various aspects of the present invention.

Also, various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

Numerous benefits may be provided by the integrated sorting, melting and fabrication system described herein, some of which have been discussed above. For instance, embodiments of the integrated system described herein may provide energy savings compared with a conventional system that, as discussed above, may be located at multiple physical sites. For example, accurate metal sortation and precise melt chemistry measurements with real-time feedback control that result in an on-spec alloy may avoid the conventional practice of diluting the melt with expensive and energy-intensive primary metal. The net benefit of these improvements may result in, for example, 3.31 kWh/kg savings over the conventional system (e.g., that shown in FIG. 1). In addition, an entire step of melting formed ingots is eliminated in the integrated system saving, for example, 1.96 kWh/kg over the conventional system. Additional savings, e.g., 0.86 kWh/kg (14%) may come from replacing the conventional dryer and melter in a conventional system with the decoaters and/or furnaces described herein, such as a VFD and an electric furnace.

Economic benefits may also be realized, for example, for the U.S. secondary aluminum industry. Such economic benefits may arise from embodiments of the integrated system described herein that have lower energy costs, lower raw material costs, and/or lower metal losses than a conventional system (e.g., as shown in FIG. 1). Such benefits may result from a combination of using less expensive raw materials; eliminating pre-sorted scrap due to advanced sorting technologies such as Z-Sort™ (e.g., which may be used to process Twitch); and reducing oxidation of the melt due to greater decoating of the metal prior to melting (e.g., via a VFD) by using an electric furnace which has no oxidizing products of combustion contacting the molten metal. Contrasting a conventional process with a conventional furnace which has a metal loss of between 8% and 15%, embodiments of the integrated system described herein may have a metal loss of only 1-2%.

Since metal loss and energy use may both be reduced in embodiments of the integrated system described herein compared with a conventional system, scrap metals that are not cost-effective to sort, melt and use in product fabrication within conventional systems may, to the contrary, be cost effective within the integrated system.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of this disclosure. Accordingly, the foregoing description is by way of example only, and is not intended as limiting.

What is claimed is:

1. A system for producing a target molten metal composition, comprising:
    at least one processor configured to generate and output a control signal;
    a sorting device;
    a decoater; and
    a furnace,
    wherein the sorting device comprises:
        a metals input configured to receive pieces of metal as input;
        a control signal input configured to receive the control signal output by the at least one processor, the control signal specifying at least one metal for the sorting device to preferentially output;
        a classification module configured to determine classifications of the input pieces of metal; and
        a metals output configured to output sorted pieces of metal to the decoater based on the determined classifications of the pieces of metal and the control signal, the sorted pieces of metal including the at least one metal;
    wherein the decoater comprises:
        an input coupled to the sorting device to receive the sorted pieces of metal output from the sorting device; and
        a combustion chamber configured to remove organic materials from the pieces of metal by combusting said organic materials, thereby producing decoated pieces of metal;
    wherein the furnace is coupled to the decoater and is configured to receive the decoated pieces of metal from the decoater and to melt the received pieces of metal to generate a bath of molten metal, the furnace comprising at least one sensor configured to analyze a composition of the bath of molten metal; and
    wherein the at least one processor is configured to receive data from the at least one sensor indicating the composition of the bath of molten metal, and wherein the control signal generated by the at least one processor is generated according to the received data received from the at least one sensor.

2. The system of claim 1, wherein the control signal is determined by the at least one processor based on a comparison of the received data with the target molten metal composition.

3. The system of claim 1, wherein the sorting device comprises one or more storage containers, and wherein the control signal is received by the one or more storage containers.

4. The system of claim 1, wherein the decoater is configured to utilize heat generated through said combustion of organic materials to perform subsequent combustion of organic materials.

5. The system of claim 1, wherein the at least one metal specified by the control signal includes at least one metal alloy.

6. The system of claim 1, wherein the classification module is configured to determine the classifications of the input pieces of metal by detecting fluoresced x-rays emitted from the pieces of metal.

7. The system of claim 1, wherein the classification module is configured to determine the classifications of the input pieces of metal using a Laser Induced Breakdown Spectroscopy (LIBS) device.

8. The system of claim 1, wherein the classification module is configured to determine an effective atomic number of pieces of metal.

9. The system of claim 1, wherein the sorting device is configured to sort the input pieces of metal into a plurality of sorting categories by comparing the determined classifications of the input pieces of metal with the plurality of sorting categories.

10. The system of claim 9,
wherein the sorting device includes a plurality of bins, each bin corresponding to one or more of the plurality of sorting categories, and
wherein the pieces of metal received by the decoater from the sorting device are provided from at least one of the plurality of bins.

11. The system of claim 1, further comprising one or more fabrication devices and wherein the furnace is configured to output molten metal from the bath of molten metal to the one or more fabrication devices.

12. The system of claim 11, wherein the one or more fabrication devices include one or more casting machines, foundries, extruders, ingot molds, and/or rolling mills.

13. The system of claim 12, wherein the sorting device is configured to operate with a first throughput, being a rate at which the sorted pieces of metal are output from the sorting device, wherein the furnace is configured to operate with a second throughput, being a rate at which pieces of metal are provided to the bath of molten metal, and wherein the sorting device and the furnace are operated such that the first throughput and second throughput are substantially equal.

14. The system of claim 1, further comprising a plurality of casting machines, wherein the furnace is configured to output molten metal from the bath of molten metal to the plurality of casting machines.

15. The system of claim 1, wherein the metals input includes a conveyer to convey the input pieces of metal to the sorting device.

16. The system of claim 1, wherein the at least one sensor comprises means for interrogating a sample of molten metal from an interior of the bath of molten metal.

17. The system of claim 1, wherein the at least one sensor is configured to analyze a composition of the bath of molten metal by detecting x-rays fluoresced from the molten metal.

18. The system of claim 1, wherein the at least one sensor is configured to analyze a composition of the bath of molten metal by:
vaporizing a portion of the molten metal; and
providing light emitted by the vaporized portion to a spectrometer.

19. The system of claim 18, wherein the at least one sensor includes a Laser Induced Breakdown Spectroscopy (LIBS) sensor.

20. The system of claim 1, wherein the sorting device is configured to determine whether to output a sorted piece of metal to the decoater or whether to provide the piece of metal to an alternative destination.

21. The system of claim 1, wherein the sorting device includes a plurality of bins for storing the sorted pieces of metal, and wherein the sorting device is configured to select one of the plurality of bins from which to output a sorted piece of metal.

22. The system of claim 11, wherein the sorting device, the furnace and the at least one processor are housed within a single building.

* * * * *

UNITED STATES PATENT AND TRADEMARK OFFICE
CERTIFICATE OF CORRECTION

PATENT NO. : 9,956,609 B1
APPLICATION NO. : 14/747341
DATED : May 1, 2018
INVENTOR(S) : Robert De Saro et al.

Page 1 of 1

It is certified that error appears in the above-identified patent and that said Letters Patent is hereby corrected as shown below:

In the Specification

At Column 1, Line 13, immediately after the section entitled "CROSS-REFERENCE TO RELATED APPLICATIONS" and before the section entitled "BACKGROUND", please insert the following new section:
--STATEMENT REGARDING FEDERALLY SPONSORED RESEARCH OR DEVELOPMENT
This invention was made with government support under Contract No. DE-AR0000417 awarded by the Department of Energy's Advanced Research Projects Agency-Energy (ARPA-E). The government has certain rights in the invention.--

Signed and Sealed this
Twenty-ninth Day of January, 2019

Andrei Iancu
*Director of the United States Patent and Trademark Office*